March 17, 1936.  E. F. MARRESFORD  2,034,108
BISCUIT UNLOADER
Filed Oct. 4, 1933  2 Sheets-Sheet 1
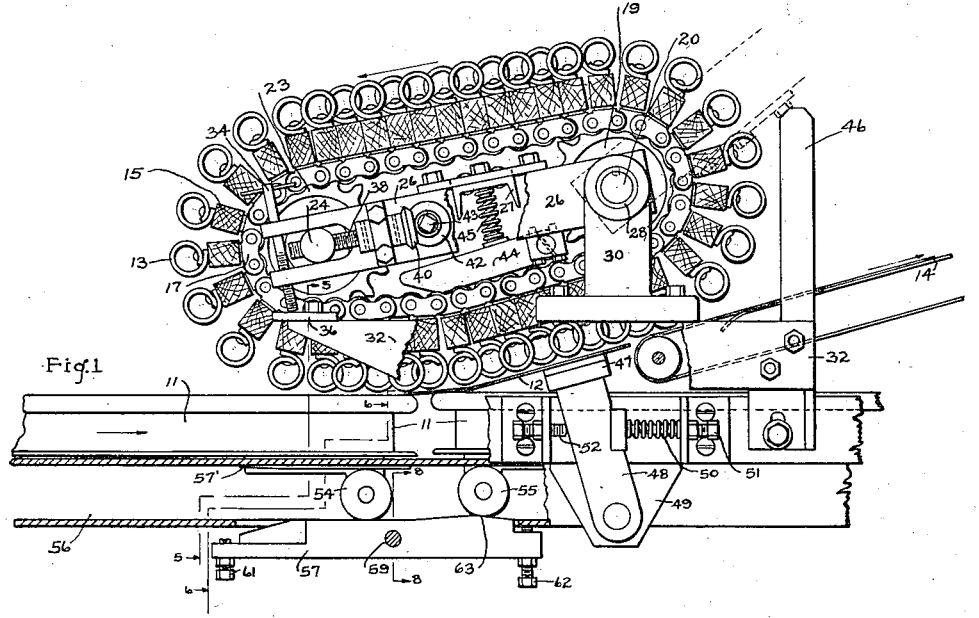
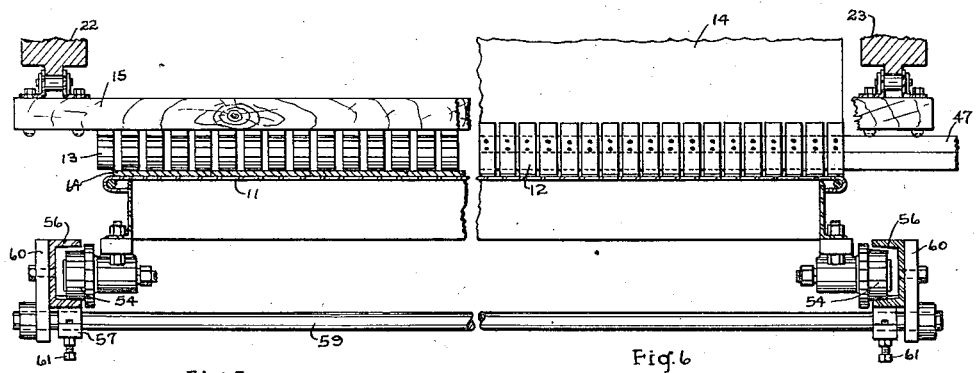
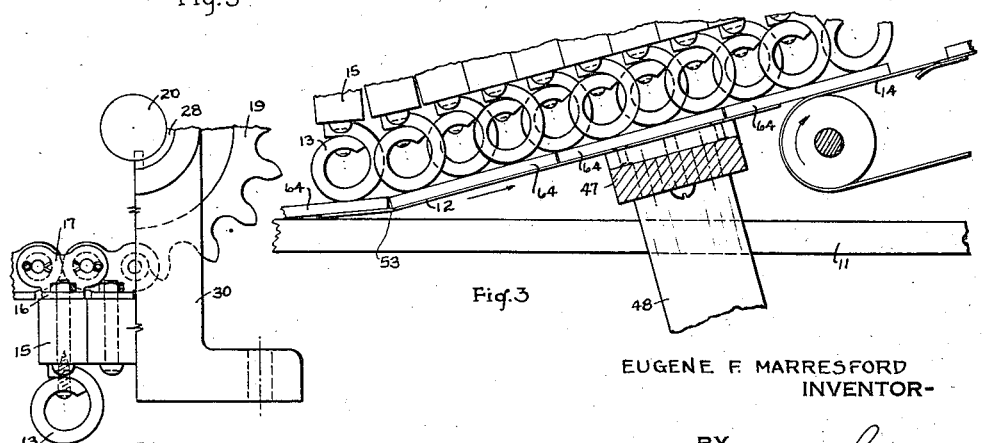
EUGENE F. MARRESFORD
INVENTOR-
BY Henry J. Savage
ATTORNEY- March 17, 1936.  E. F. MARRESFORD  2,034,108
BISCUIT UNLOADER
Filed Oct. 4, 1933  2 Sheets-Sheet 2

EUGENE F. MARRESFORD
INVENTOR

BY Henry J Savage
ATTORNEY

Patented Mar. 17, 1936

2,034,108

UNITED STATES PATENT OFFICE 2,034,108

BISCUIT UNLOADER

Eugene F. Marresford, New York, N. Y., assignor to National Biscuit Company, New York, N. Y., a corporation of New Jersey Application October 4, 1933, Serial No. 692,070

13 Claims. (Cl. 107—7)

My invention relates to unloading devices and particularly to means for unloading biscuits and the like from baking pans and delivering them to stacking or packing machines.

Heretofore baked goods, such as biscuit, crackers and cookies, when not unloaded by hand, have been unloaded from the baking pans either by dumping, that is, tilting of the pans so that the biscuit would slide off, or by scrapers moving across the face of the pans. These means are effective in discharging the biscuit, but many biscuit are broken and all are delivered in a helter-skelter manner and must be faced or sorted and re-arranged for packing.

The principal object of my invention is to provide means that will automatically unload biscuit and the like from continuously moving baking pans without breaking any of the biscuit and deliver them in spaced relation and all faced the same way to packing or stacking tables or automatic packing machines.

Another object is to provide an unloading device that will unload sheet goods (such as graham crackers, soda crackers, and the like) from the baking pans, and either deliver the sheets whole or break them into transverse strips and deliver the strips in stacked or spaced relation, as may be desired, to the packing machines or tables.

Still another object is to provide an unloading device that will positively unload baked goods from the pans, no matter how tightly they adhere, yet will not break or mutilate them.

The above and other objects, which will be apparent to those skilled in this art, are attained by the embodiment of my invention illustrated in the accompanying drawings wherein:

Fig. 1 is a side elevation, partly broken away, showing one form that my invention may take.

Fig. 2 is a top plan of Fig. 1, with some of the parts broken away.

Figs. 3 and 4 are detail views showing how the biscuit are unloaded from the pan and delivered to the conveyor belt.

Figures 2, 4, 7, 8, 10:
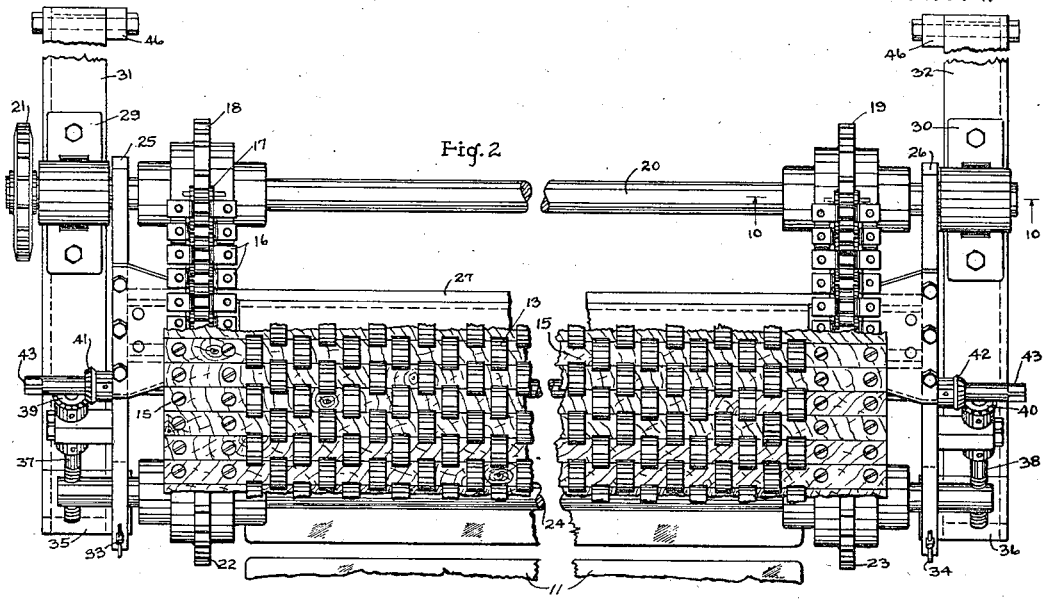

Figs. 5 and 6 are sectional views taken substantially on the lines 5—5 and 6—6 of Fig. 1, certain of the parts being omitted in Fig. 6.

Fig. 7 is a plan view of the stripper fingers.

Fig. 8 is a section on the line 8—8 of Fig. 1.

Fig. 9 is a detail view showing how the pushers and cross bars are supported on the drive chains.

Fig. 10 is a section of the pusher frame bearing taken on the line 10—10 of Fig. 2.

Referring first to Figs. 1 and 2, 11 indicates a series of baking pans carried by an endless conveyor which, as they emerge from the baking oven loaded with baked biscuit, pass under the stripper fingers 12, which loosen the biscuit from the pan. The loosened biscuit are then carried along the stripper fingers by the pushers 13 and delivered to the conveyor or apron 14, which carries them to the packing table or stacking device.

The pushers 13 are made from some yieldable material, such as felt, and are secured to transverse bars 15, which are secured to ears 16, preferably formed integral with the links 17 of two endless chains passing around sprockets 18, 19 on a shaft 20, driven by a sprocket or other suitable means 21. At their other ends the chains pass around a pair of sprockets 22, 23, rotatably mounted on a shaft 24, which is slidingly mounted in the free end of a swinging frame composed of side members 25, 26 connected by cross bar 27.

The drive shaft 20 is rotatably mounted in bushings 28, which are fixed in bearing members or standards 29, 30, mounted on fixed frame members 31, 32, supported in fixed relation adjacent the traveling baking pans 11.

The frame members 25, 26 are pivotally mounted on the bushings 28, as best shown in Figs. 1 and 10, which permits the pusher frame to be adjusted to and from the pans 11 and stripper fingers 12. The pushers 13 contact with the tops of the biscuits being unloaded and since the thickness and size of the biscuits vary it is necessary that the pushers be adjustable with respect to the baking pans so that they will exert the proper pressure on the biscuits to carry them along the stripper fingers 12 and deliver them to the conveyor 14. To provide this adjustment the free ends of the frame members 25, 26 are provided with adjusting screws 33, 34, the lower ends of which contact with the abutments 35, 36 secured to the frame members 31, 32, as best shown in Fig. 1. It is also necessary with different styles of biscuit to be able to change the contour of the lower run of the pushers 13 independently of the pressure on the biscuit. Preferably this is accomplished by longitudinal adjustment of the shaft 24, in the side members 25, 26. Each end of the shaft 24 is threaded to receive a screw 37, 38 carrying bevel gears 39, 40 meshing with a pair of gears 41, 42 fixed to an adjusting shaft 43, which extends across the carriage and is rotatably mounted in the side members 25, 26. Rotation of the shaft 43 shifts the shaft 24 in the carriage so as to lengthen or decrease the distance between the driving and driven sprockets and permits the chain and pushers to sag more or less on the under run, the direction in which the pushers are driven being indicated by the arrow in Fig. 1. The width of the cross bars 15 is equal to the pitch of the chains so that, although their upper runs may not be supported between sprockets, they will always lie in straight lines on the upper runs, and under all conditions of adjustment all of the sag will occur in the lower runs which permits accurate control of the contour. In some cases it is desirable to have a positive means for adjusting the contour of the lower run of the pushers and for this purpose I have provided a pair of contour cams 44, which are pivotally mounted at one end on the side frame members 25, 26 (one on each frame member) and have their lower surfaces in contact with the chains carrying the pushers. The tops of these cams are yieldably pressed downward into contact with the chains by springs 45, which at their top ends bear against the cross bar 27. By means of the construction just described I provide a floating carriage for the pushers 13 which is supported by the adjusting screws 33, 34 and by the driving shaft 20. At times it is desirable to move the pusher carriage out of the way so as to give access to the stripper fingers, 12, and other parts of the machine. In order that this may be done conveniently I provide a fixed stop or abutment 46 fixed to the frame members 31, 32, and adapted to engage the frame members 25, 26, as indicated in dotted lines in Fig. 1 when the carriage is thrown back about its pivotal mounting on the drive shaft.

The stripper fingers 12 preferably are made from relatively narrow strips of spring steel, as shown in Fig. 7, and are secured to a cross plate 47 secured to arms 48 adapted to have a slight swinging motion about their lower ends where they are pivoted to brackets 49 fixed to the frame of the machine. The arms 48 are yieldably urged against the direction of travel of the baking pans by springs 50 the tension of which can be adjusted by adjusting screws 51 as best shown in Fig. 1. Adjustable stops 52 are provided to limit the forward motion of the arms 48 and stripper fingers. The stripper fingers are slightly bent or offset near their forward ends where they contact with the baking pans, as clearly shown at 53 in Figs. 3 and 7.

The stripper fingers press lightly upon the tops of the baking pans, the pressure being varied depending upon the type of biscuit being unloaded and the firmness with which they adhere to the pans. The baking pans as shown in Fig. 1 have a slight gap between them and unless some means is provided to prevent it, the ends of the stripper fingers, when they leave one pan, will spring down slightly between the pans and strike the end of the next adjacent pan. In order to prevent this I provide means for slightly lifting the trailing end of a pan which has just been unloaded so that it will lift the fingers slightly as they pass over the space between the two pans and come in contact with the leading end of the next following pan. I secure this movement of the pans by interposing cams at the proper points in the tracks on which the conveyor runs that supports the baking pans. This conveyor at the end of each pan has rollers 54, 55 (see Fig. 1) which run on tracks 56 on each side of the oven, the tracks preferably being formed from channels, as best shown in Figs. 5 and 6. At a suitable point the lower flange of each of these channels is cut away as shown in Figs. 1 and 8, and a cam 57 is secured to each end of a shaft 59 mounted in a bearing on a bracket 60 secured to each of the tracks, the cams being located on the shaft so as to take the place of that part of each track which has been cut away. The rollers 54, 55 are somewhat smaller in diameter than the distance between flanges on the tracks 56 which permits the pans to have a slight vertical play or movement. On the inside of the top flange of each track 56, opposite the cam 57, I place a filler strip 57' (Figs. 1 and 8) of such thickness as to take up or prevent the vertical movement of the rollers 54, 55 at this point. At each end the cams are provided with adjusting screws 61, 62 to limit the amount of their tilting action about the axis of the shaft 59. Each cam has a rise 63 at one end, which is so positioned that the roller 55 will ride up on this rise just before it reaches the position shown in Fig. 1 at which time the roller 54 will be in contact with the lefthand end of the cam and also with the filler strip 57' so that the roller 55 and its associated baking pan 11 will be slightly lifted at that time and the roller 54 and its associated baking pan will continue to travel in a straight line and there will be no vertical movement of a pan while it is being unloaded by the stripper fingers 12. As soon as the stripper fingers 12 have bridged the gap between the pans, the roller 54 will be approximately in alignment with the shaft 59, and continued movement of the conveyor will cause the cams to rock about the shaft 59 until the adjusting screws 61 come in contact with the lower faces of the track 56. At this time the slope of the cam leading to the peak of the rise 63 is in alignment with the lower flange of the track 56, so that the roller 54 and its associated pan continue to travel in a straight line during the entire unloading period. This is essential, as otherwise there would be constant variations in the pressure of the strippers on the pans and of the pushers on the biscuit. With some types of pan suspension it is desirable not to raise the pans but to raise the stripper fingers slightly when transferring from one pan to another. This is easily effected by moving the arms 48 about their pivot centers by operatively connecting them to cams similar to cams 57 to be actuated by contact with the pans or pan rollers.

My unloading means is adapted to unload all kinds of bakery products from baking pans, but it is particularly advantageous in unloading what is known as sheet goods. Many forms of biscuits, such as soda crackers, graham crackers, and the like, are baked in sheets on pans as distinguished from cut out or drop goods which are spaced apart on the pans. These sheets of baked goods are scored both transversely and longitudinally and after being baked are broken along these lines to form the crackers or biscuit. When sheet goods are unloaded by means of my invention they are automatically broken into transverse strips by reason of the pressure of the pusher fingers upon the sheet of goods. As shown in Figs. 3 and 4, when a sheet of goods is being unloaded it will form a bridge across the offset portion 53 of the stripper fingers, as best shown in Fig. 4, but when the score line in the sheet between rows of biscuit is directly over this offset 53, the pressure of the pusher fingers is sufficient to break the sheet along this score line, as shown in Fig. 3. This breaks the sheet of baked goods into a number of transverse strips 64, which are then delivered by the conveyor or belt 14 to the packing table or any other desired place. Some kinds of sheet goods remain slightly plastic while warm and are not broken apart or separated for packing until they have cooled. When unloading goods of this kind, the pressure of the pushers will be adjusted so as not to break them into strips as they pass over the offsets 53, but the entire sheet is delivered to the conveyor 14. Any kind of sheet goods can be unloaded in whole sheets in this manner by properly adjusting the pressure and contour of the pusher fingers 13.

It will be noted that in my unloading device there is no mixing up or helter-skelter scattering of the biscuits as in previous devices but all biscuits are delivered by the belt 14 with their top sides up and do not have to be passed through a facing machine before packing. In order that the biscuits may be slightly spaced apart on the packing table I preferably drive the conveyor 14 faster than the pushers 13 which in turn travel a very slight amount faster than the baking pans 11, so that when the rows or strips of biscuit are delivered to the conveyor 14, they will be spaced apart thereon. The amount of the space, of course, can be determined by adjusting the speed of the conveyor 14 relative to the pusher fingers 13. In some instances, the belt 14 may be run slower than the pushers so that the biscuit will be overlapped to some extent.

While I have shown the stripper fingers 12 as separate spring fingers, they may sometimes be made from a single sheet of metal or other material but I have found the separate fingers to be very advantageous, especially when unloading biscuit that stick tightly to the pans or when the pans may be worn or warped so as to have an uneven surface. When the separate spring fingers come in contact with a biscuit that sticks to the pan they will yield slightly, as will also the spring 50, until the resistance becomes sufficient to force the front edges of the fingers under the biscuits and this yielding action of the spring 50 causes the fingers to have a vibrating or chiseling action so that they will dig under and loosen biscuit no matter how tightly they stick to the pans. It will be understood that while I have described the strippers as being fingers that this term is illustrative of the invention and any other stripping means, such as a sheet of metal, or other device, that may perform an equivalent function is to be understood when the term stripper fingers is used.

Another important feature of my invention is that all of the adjustments may be made while the machine is in operation. Thus the screws 61, 62 on the cam 57 can be adjusted during operation to adjust the lift of the leading pan and the screws 51, 52 can be similarly adjusted to vary the pressure of the strippers on the pans. The contour and pressure of the pushers can also be adjusted during operation by means of the adjusting screws 25, 26, and the adjusting shaft 43.

It will also be understood that the form of my invention that I have shown in the drawings and the terms that I have used in describing it are but illustrative of one embodiment of the invention and I am not to be limited thereto except as may be required by the state of the prior art but claim as my invention all equivalents thereof that may come within the scope of my claims.

What I claim is:

1. In an unloading device, a conveyor carrying a baking pan adapted to have baked biscuit thereon, stripper fingers engaging said pan adapted to loosen the biscuit therefrom, pushers engaging the tops of the biscuit on said pan and moving in contact with the biscuit longitudinally along said stripper fingers, and means for adjusting the contour of said pushers engaging the tops of the biscuit independently of the pressure on the biscuit.

2. In an unloading device, a conveyor carrying a baking pan adapted to have baked biscuit thereon, stripper fingers engaging said pan adapted to loosen the biscuit therefrom, yieldable means pressing said fingers opposite the direction of travel of said pan, yieldable pushers engaging the tops of the biscuit and carrying them along said fingers in the direction of pan travel, means for adjusting the pressure of said pushers on the biscuit, and means for adjusting the yieldable finger pressing means.

3. In an unloading machine, a conveyor carrying a series of baking pans adapted to have baked biscuit thereon, a second traveling conveyor, stripper fingers successively engaging said pans at one end to loosen the biscuit therefrom and at the other end delivering to said second conveyor, pushers engaging the biscuit on the pan and travelling in engagement with the biscuit longitudinally along said fingers, said pushers being driven in the direction of pan travel and carrying the biscuit along said fingers to said conveyor, means for adjusting the pressure of said pushers on the biscuit, and means for adjusting the contour of the pushers engaging the biscuit independently of the pressure on the biscuit.

4. In an unloading machine, a conveyor carrying a series of baking pans, stripper fingers successively engaging said pans, means for raising the trailing edge of the leading pan as said fingers pass from engagement with the leading pan to the next following pan.

5. In an unloading machine, a conveyor carrying a series of baking pans, a guide track for said pans, rollers on said pans engaging said guide track, stripper fingers successively engaging said pans, and a transfer cam located in said guide track and actuated by contact with the rollers on successive pans to transfer said unloading fingers from engagement with one pan to the next following pan.

6. In an unloading machine, a conveyor carrying a baking pan adapted to have a sheet of baked goods with transverse score lines thereon, stripper fingers having angularly offset tips engaging said pan and adapted to engage under said sheet of baked goods, pushers adapted to engage said sheet of baked goods to move it along said fingers, and means for adjusting the pressure of said pushers on said sheet goods to break it along said score lines as said score lines pass over said angularly offset tips.

7. In an unloading machine, a fixed frame, a drive shaft rotatably mounted thereon, a swinging frame pivotally mounted at one end co-axial with said drive shaft, a shaft slidably mounted in the free end of said swinging frame, sprockets mounted on said shafts, parallel endless chains engaging said sprockets and driven thereby, cross bars secured to corresponding links on said chains, and pushers connected to said cross bars.

8. In an unloading machine, a fixed frame, a drive shaft rotatably mounted thereon, a swinging frame pivotally mounted at one end co-axial with said drive shaft, a shaft slidably mounted in the free end of said swinging frame, sprockets mounted on said shafts, parallel endless chains engaging said sprockets and driven thereby, cross bars secured to corresponding links on said chains, pushers connected to said cross bars, and stripper fingers cooperating with said pushers on the lower runs of said chains.

9. In an unloading machine, a fixed frame, a drive shaft rotatably mounted thereon, a swinging frame pivotally mounted at one end co-axial with said drive shaft, a shaft slidably mounted in the free end of said swinging frame, sprockets mounted on said shafts, parallel endless chains engaging said sprockets and driven thereby, cross bars secured to corresponding links on said chains, pushers connected to said cross bars, stripper fingers cooperating with said pushers on the lower runs of said chains, and means for adjusting the contour of said pushers on their lower run.

10. In an unloading machine, a fixed frame, a drive shaft rotatably mounted thereon, a swinging frame pivotally mounted at one end co-axial with said drive shaft, a shaft slidably mounted in the free end of said swinging frame, sprockets mounted on said shafts, parallel endless chains engaging said sprockets and driven thereby, cross bars secured to corresponding links on said chains, pushers connected to said bars, stripper fingers cooperating with said pushers on the lower runs of said chains, and means for vertically adjusting the free end of said frame with respect to said fingers.

11. In an unloading machine, a pivotally mounted frame, a pair of endless carriers mounted thereon, means for driving said carriers, cross bars connecting said carriers and traveling therewith, yieldable pushers mounted on said cross bars, a series of traveling baking pans moving in the direction of said pushers on the under run of said carriers and adjacent thereto, inclined stripper fingers having their lower ends successively contacting said pans and disposed between the pans and pushers, a conveyor to which the upper ends of said fingers deliver articles from said pans, and means for adjusting said pushers toward and from said pans.

12. In an unloading device, a conveyor carrying a baking pan adapted to have baked biscuit thereon, inclined stripper fingers engaging said pans to loosen the biscuit therefrom, traveling pushers engaging the tops of the biscuit and moving them along said stripper fingers, and resilient means opposing movement of said fingers in the direction of pan travel and causing said fingers to have a vibratory chiseling action to loosen biscuit adhering to said pan.

13. In an unloading device, a conveyor carrying a baking pan adapted to have a sheet of baked goods thereon that is scored transversely of said pan, unloading fingers having off-set ends adapted to be inserted under said sheet, means for transferring said sheet from said pan to said fingers, and means pressing on said sheet to break it along said transverse score lines as said score lines pass successively over said offsets in the fingers.

EUGENE F. MARRESFORD.